(12) United States Patent
Griffith et al.

(10) Patent No.: US 10,089,593 B1
(45) Date of Patent: Oct. 2, 2018

(54) VISUALLY DISTINCTIVE INDICATORS TO DETECT GROUPING ERRORS

(71) Applicant: Amazon Technologies, Inc., Reno, NV (US)

(72) Inventors: Charles M. Griffith, Bainbridge Island, WA (US); Andrew Shapira, Kirkland, WA (US)

(73) Assignee: Amazon Technologies, Inc., Reno, NV (US)

(*) Notice: Subject to any disclaimer, the term of this patent is extended or adjusted under 35 U.S.C. 154(b) by 634 days.

(21) Appl. No.: 14/109,829

(22) Filed: Dec. 17, 2013

(51) Int. Cl.
*G06Q 10/08* (2012.01)

(52) U.S. Cl.
CPC .................. *G06Q 10/083* (2013.01)

(58) Field of Classification Search
CPC .................................................. G06Q 10/083
USPC ........................................................ 700/224
See application file for complete search history.

(56) References Cited

U.S. PATENT DOCUMENTS

| | | | |
|---|---|---|---|
| 4,254,875 A | 3/1981 | Varhelyi | |
| 4,561,060 A | 12/1985 | Hemond | |
| 5,246,332 A | 9/1993 | Bernard, II et al. | |
| 5,301,790 A | 4/1994 | Prydtz et al. | |
| 5,363,310 A | 11/1994 | Haj-Ali-Ahmadi et al. | |
| 5,385,243 A | 1/1995 | Jackson et al. | |
| 5,388,706 A | 2/1995 | Baldur | |
| 5,406,770 A | 4/1995 | Fikacek | |
| 5,509,538 A | 4/1996 | Spindler et al. | |
| 5,613,591 A | 3/1997 | Heit et al. | |
| 5,660,305 A | 8/1997 | Lasher et al. | |
| 5,712,989 A | 1/1998 | Johnson et al. | |
| 5,720,157 A | 2/1998 | Ross | |
| 5,771,657 A | 6/1998 | Lasher et al. | |
| 5,794,789 A | 8/1998 | Payson et al. | |
| 5,934,413 A | 8/1999 | Konig et al. | |
| 5,977,501 A | 11/1999 | Werkheiser et al. | |
| 6,061,607 A | 5/2000 | Bradley et al. | |
| 6,148,291 A | 11/2000 | Radican | |
| 6,259,967 B1 | 7/2001 | Hartlepp et al. | |

(Continued)

FOREIGN PATENT DOCUMENTS

| | | |
|---|---|---|
| EP | 1693319 | 8/2006 |
| JP | 06080219 | 3/2006 |

OTHER PUBLICATIONS

"Product Search," printed from http://mailroomconsultancysurveys.com/mail . . . on Sep. 29, 2005, Apr. 15, 2004, pp. 1-17.

(Continued)

*Primary Examiner* — Kyle O Logan
(74) *Attorney, Agent, or Firm* — Robert C. Kowert; Meyertons, Hood, Kivlin, Kowert & Goetzel, P.C.

(57) ABSTRACT

Various embodiments of a system and method and apparatus for determining a grouping of containers, assigning a visually distinctive indicator to the group, directing application of the visually distinctive indicator to the containers of the group are disclosed. The visually distinctive indicators of containers of a group may be analyzed manually or automatically and a message may be issued for containers that are determined to not be members of the group based on the dominant visually distinctive indicators of the group. The distinctive characteristics of the visually distinctive indicators may be colors, patterns or the like.

20 Claims, 10 Drawing Sheets

(56) References Cited

U.S. PATENT DOCUMENTS

| | | |
|---|---|---|
| 6,289,260 B1 | 9/2001 | Bradley et al. |
| 6,377,867 B1 | 4/2002 | Bradley et al. |
| 6,401,936 B1 | 6/2002 | Isaacs et al. |
| 6,478,144 B1 | 11/2002 | Sweazy |
| 6,484,886 B1 | 11/2002 | Isaacs et al. |
| 6,610,954 B2 | 8/2003 | Takizawa |
| 6,611,755 B1 | 8/2003 | Coffee et al. |
| 6,651,820 B2 | 11/2003 | Takizawa |
| 6,654,662 B1 | 11/2003 | Hognaland |
| 6,685,031 B2 | 2/2004 | Takizawa |
| 6,694,220 B1 | 2/2004 | Tanz |
| 6,698,655 B2 | 3/2004 | Kondo et al. |
| 6,715,267 B2 | 4/2004 | Schaefer et al. |
| 6,737,600 B2 | 5/2004 | Takizawa |
| 6,784,391 B2 | 8/2004 | Takizawa |
| 6,789,011 B2 | 9/2004 | Baiada et al. |
| 6,789,660 B1 | 9/2004 | Bruun et al. |
| 6,819,236 B2 | 11/2004 | Kawai et al. |
| 6,898,476 B2 | 5/2005 | Watanabe et al. |
| 6,937,992 B1 | 8/2005 | Benda et al. |
| 6,971,833 B1 | 12/2005 | Freudelsperger et al. |
| 7,055,741 B2 | 6/2006 | Bong et al. |
| 7,084,365 B2 | 8/2006 | Whitnable |
| 7,136,830 B1 | 11/2006 | Kuelbs et al. |
| 7,246,706 B1 | 7/2007 | Shakes et al. |
| 7,331,471 B1* | 2/2008 | Shakes .................. B07C 7/005 |
| | | 209/559 |
| 7,426,484 B2 | 9/2008 | Joyce et al. |
| 7,504,949 B1 | 3/2009 | Rouaix et al. |
| 7,584,113 B2 | 9/2009 | Denton et al. |
| 7,686,171 B1 | 3/2010 | Shakes et al. |
| 7,774,243 B1 | 8/2010 | Antony et al. |
| 7,941,244 B2 | 5/2011 | Somin et al. |
| 7,979,359 B1 | 7/2011 | Young et al. |
| 7,984,809 B1 | 7/2011 | Ramey et al. |
| 8,170,712 B2 | 5/2012 | Battles et al. |
| 2002/0036232 A1* | 3/2002 | Massod .............. G06Q 10/087 |
| | | 235/385 |
| 2002/0178074 A1 | 11/2002 | Bloom |
| 2002/0178077 A1 | 11/2002 | Katz et al. |
| 2003/0006170 A1* | 1/2003 | Lawandy ............. B07C 5/3412 |
| | | 209/3.3 |
| 2003/0083890 A1* | 5/2003 | Duncan ................ B65D 5/5035 |
| | | 705/28 |
| 2003/0116484 A1 | 6/2003 | Takizawa |
| 2003/0178481 A1 | 9/2003 | Kondo et al. |
| 2003/0222001 A1 | 12/2003 | Christ |
| 2004/0064385 A1 | 4/2004 | Tamaki |
| 2004/0073333 A1 | 4/2004 | Brill |
| 2004/0193502 A1 | 9/2004 | Heitner et al. |
| 2006/0080133 A1 | 4/2006 | Das et al. |
| 2006/0136237 A1 | 6/2006 | Spiegel et al. |
| 2006/0151288 A1 | 7/2006 | Reznik et al. |
| 2006/0278501 A1 | 12/2006 | Sweazy |
| 2007/0071585 A1 | 3/2007 | Henkel |
| 2007/0150383 A1 | 6/2007 | Shakes et al. |
| 2007/0156498 A1 | 7/2007 | Zwerger et al. |
| 2007/0162360 A1 | 7/2007 | Congram et al. |
| 2007/0209976 A1 | 9/2007 | Worth et al. |
| 2007/0246328 A1 | 10/2007 | Reznik |
| 2007/0276684 A1 | 11/2007 | Scott et al. |
| 2007/0283590 A1 | 12/2007 | White et al. |
| 2008/0015884 A1 | 1/2008 | Jamula |
| 2008/0093273 A1 | 4/2008 | Stemmle |
| 2008/0207114 A1 | 8/2008 | Tuttle |
| 2008/0264838 A1 | 10/2008 | Limpens |
| 2009/0081008 A1 | 3/2009 | Somin et al. |
| 2009/0112675 A1 | 4/2009 | Servais |

OTHER PUBLICATIONS

U.S. Appl. No. 11/023,759, filed Dec. 28, 2004, Jonathan J. Shakes.
U.S. Appl. No. 11/023,737, filed Dec. 28, 2004, Jonathan J. Shakes.
U.S. Appl. No. 61/502,790, filed Jun. 29, 2011, Kevin R. Vliet.
U.S. Appl. No. 12/242,482, filed Sep. 30, 2008, Devesh Mishra.
U.S. Appl. No. 13/280,134, filed Oct. 24, 2011, Kevin R. Vliet et al.
U.S. Appl. No. 13/280,137, filed Oct. 24, 2011, Kevin R. Vliet et al.
U.S. Appl. No. 13/304,196, filed Nov. 23, 2011, Kevin R. Vliet et.
U.S. Appl. No. 13/304,198, filed Nov. 23, 2011, Peter D Rowley.
U.S. Appl. No. 12/414,836, filed Mar. 31, 2009, Alexander C. Prater.

* cited by examiner

VISUALLY DISTINCTIVE INDICATORS TO DETECT GROUPING ERRORS

BACKGROUND

In a distribution system, a retailer or other product distributor (which may collectively be referred to as distributors) typically maintains an inventory of various items at one or more distribution centers, fulfillment centers, cross-docking facilities, materials handling facilities or warehouses (which may collectively be referred to herein as fulfillment centers). The inventory items are ordered from one or more vendors, received at the materials handling facilities as inbound shipments, and stocked in inventory of the materials handling facilities. In an order fulfillment process, orders for items may be received from customers of the distributor. Units of the ordered items are picked from various locations in the inventory in the materials handling facilities, processed for shipping, and shipped as outbound shipments to the customers.

Various processes in a facility may include a sortation process. For example, units of items picked for orders are sorted into their respective orders. Requests (e.g., orders) for units of items from requestors may be divided among multiple agents, who then pick units corresponding to the requests. The orders may be subdivided among the agents; therefore, two or more of the agents may pick units for one order. Consequently, a sort operation to select the proper units of items for given orders from the aggregations of units returned by each respective agent is required. Conventionally, sorting may be performed using automated sorting mechanisms or manual sorting systems. Automated sorting mechanisms for sorting certain types of inventory units according to individual orders include, but are not limited to, the Crisplant® sorter, Eurosort® sorters, and automated sorting mechanisms offered by other vendors. Using an automated sorting mechanism, incoming picked units of items for multiple different customer orders are received at the automated sorting mechanism and sorted by the automated mechanism according to individual shipments. Once items are sorted into respective shipments, each shipment can be packaged and shipped to respective customers. Sometimes shipments or packages or items may be mis-sorted and the mis-sort may go unnoticed noticed, either by automated systems or by human observation. For example, some systems (e.g., sorting operations) may rely upon computer readable identification that is not readily decipherable to human observation without an electronic device such as RFID or bar code reader. Some such systems may support dynamic and/or random processing (e.g., random stowing) where the organization of items, or packages or containers are not readily apparent to observation.

Figure 1:
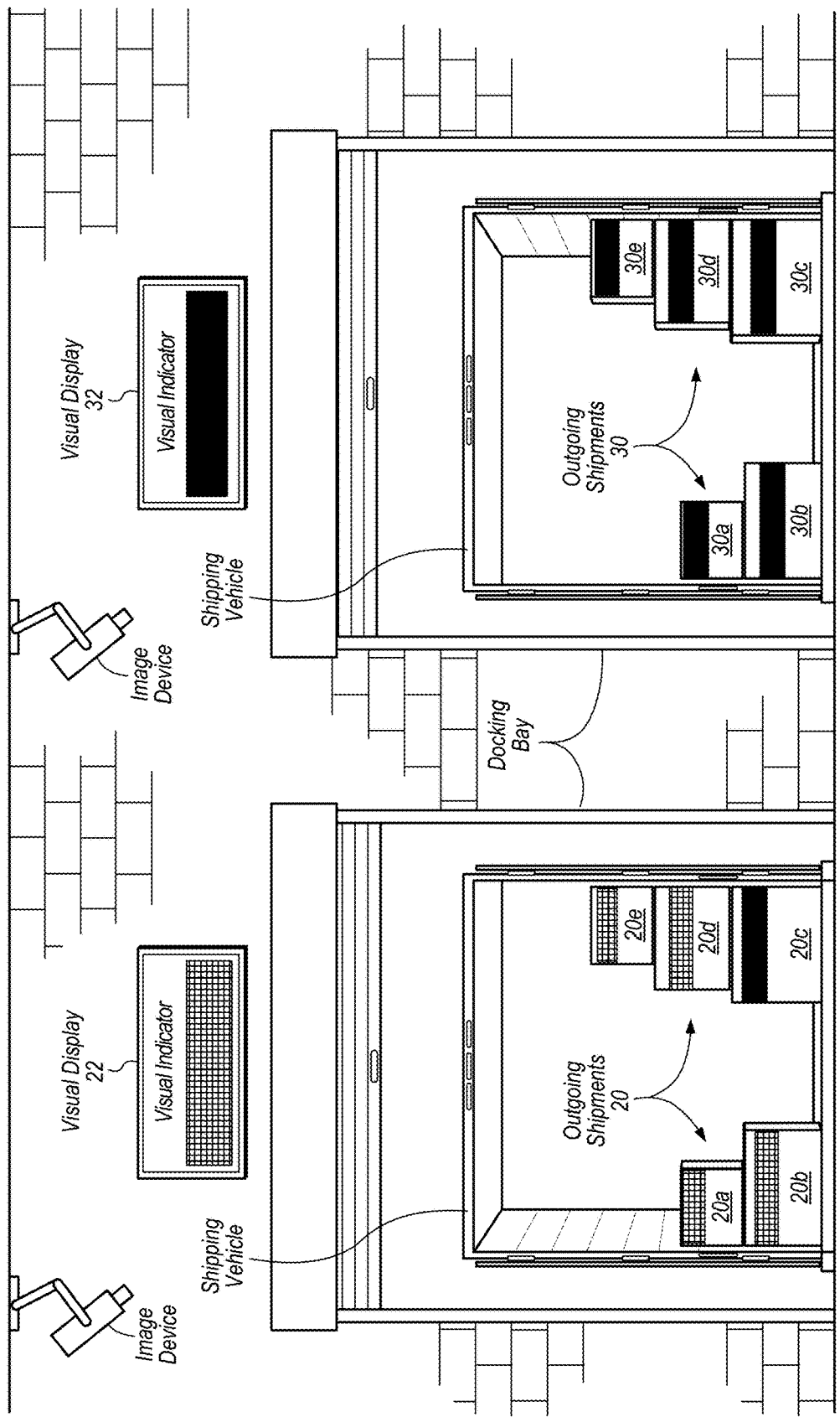
FIG. 1 illustrates a shipping area in a materials handling facility in which embodiments of a system and process for application and analysis of visually distinctive indicators of containers to facilitate detection of grouping errors may be implemented, according to some embodiments.

While various embodiments are described herein by way of example for several embodiments and illustrative drawings, those skilled in the art will recognize that various embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of various embodiments as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method and visually distinctive indicator for associating a package or container with an operational process as an aggregate decision for a group, applying visually distinctive indicators to the packages or containers and relying on the visually distinctive indicators to distinguish packages or containers that are not part of the group are disclosed.

While the description herein is largely presented with respect to outbound shipments transported from a materials handling facility, such as shipments to customers or trans-shipments sent to other materials handling facilities, the systems and methods described can also be applied in a variety of ways to inbound items, such as received inventory or to various other processes within a materials handling facility. For example, in some cases, the materials handling facilities described herein may support various processes such as receiving, stowing, picking, sorting, packing or shipping for example. It is contemplated that the various systems and methods disclosed may be applicable to other types of facilities and other types of processes, such as manufacturing for example.

The systems, methods and devices as described herein, may be utilized in a number of different facilities and situations, including, but not limited to a sort center, shipping hub, material handling facilities, order fulfillment centers, rental centers, distribution centers, packaging facilities, shipping facilities, libraries, museums, warehouse storage facilities, shopping centers, grocery stores, car parking lots, etc. In general, the systems, methods and devices as described herein may be used in any situation in which containers or other objects are grouped.

In a materials handling facility, various processes may be performed in various areas. The processes may be carried out on or be carried out to produce items that may be placed in packages or containers. The various processes may include moving the items in packages or containers to or from one area of the facility to another area of the facility, where another process may be performed, for example. The processes themselves or the movement of the packages or containers in between processes may be performed in groups. An agent may be tasked with performing the process on the items in the packages or containers or on the packages or containers themselves. An agent may be tasked with moving the packages or containers either as a group or singly. Agents may rely upon various processes and devices to track or coordinate the groups of packages or containers, for example, a group of packages may be placed into a container or containers such that the group of packages are kept together or a process may be carried out on an entire group of items or packages before another group of items or packages are processed.

A control system (e.g., a grouping control system) and a visually distinctive indicator application system may be used to facilitate detection of grouping errors in a materials handling facility. For example, a grouping-based control system may be configured to determine a visually distinctive indicator. In some embodiments, the visually distinctive indictor may be selected and associated with a group of items, packages or containers, for example. The visually distinctive indicator may be applied to the group of containers such that when containers are grouped together (e.g. for processing) a container without an indicator or with a different visually distinctive indicator from the group is readily observed by an agent or identified by automated analysis. In some embodiments, the systems, methods and processes disclosed herein may be used as a backup to a primary system of organization or containerization or to verify a primary system of organization or containerization.

A grouping control system may comprise various components in various arrangements. In one example, the grouping control system may comprise a grouping control component and any number of devices used to apply visually distinctive indicators or capture images of containers. In another example, a grouping control system may include fewer or more components such as communication devices for communicating with agents (e.g., either via a display or otherwise). Various other arrangements and combinations of the various components described herein are also contemplated.

The visually distinctive indicator itself may take any form without departing from the scope of the invention. For example, the visually distinctive indicator may be implemented as tape, a sticker, paint, ink, a visual indication device such as a battery operated and/or electronically controlled display or a tag or as a visually-recognizable attribute or characteristic of the packaging or container itself. In some embodiments, the visually distinctive indicator may be created by applying light, electromagnetic radiation, a current or a voltage to the input container where the input container comprises a material that reacts to the applied light, electromagnetic radiation, current or voltage to create the visually distinctive indicator.

In some embodiments, the visually distinctive indicator may indicate, either via application or via its own characteristics, the orientation of the container the indicator is applied to. For example, tape with two stripes on it may be wrapped around a container such that the thicker stripe or a particular color stripe is oriented in the down position. In some embodiments, the indicator may indicate the horizontal rotation of the container. For example, an indicator such as tape that is wrapped around the container may include text on a portion of the tape that describes "this side forward."

In some embodiments, totes or other containers themselves may be of a particular color that acts as a visually distinctive indicator. In some embodiments, the tote or container may change color when a temperature or charge of electricity is applied to the tote or when the tote is exposed to a particular wavelength of radiation, for example. Portions or features of a tote or container may change color, in some embodiments.

It is known to apply machine-readable labels to containers such as UPC bar codes or other types of bar codes that can be read by devices such as scanners. Such machine readable codes are not readily observable as a distinguishing feature of a container. For example, it may be difficult for an agent to even find a UPC code on each of a group of containers at once, to say nothing of determining if all the UPC codes of the group are the same or not without moving to each particular container and moving shifting each container around to find where the code is for that container. In some embodiments, it may be more efficient or useful to readily observe if a group of containers are intended to be grouped together with an observation of the entire group at once instead of looking at each individual member of the group one-by-one. Labels that are intended to be machine-readable by scanners are generally not helpful to agents for such observation. Additionally, bar codes and the like generally must be converted into a human readable version of the code to be useful for grouping and/or visual distinction.

The visually distinctive indicator may be human-observable or recognized by automation, in some embodiments. For example, a visually distinctive indicator may exhibit characteristics that can be observed by a human or mechanized/electronic agent performing an operation at a facility. Some visually distinctive indicators may have characteristics that are observable at a distance, for example, shapes, patterns, colors, relatively large sizes, and bright colors. Luminescence or flashing may be a characteristic of a visually distinctive indicator. In some embodiments, a visually distinctive indicator may not need to be converted for use in grouping and/or visual distinction. For example, a visually distinctive indicator that is a color may not need to be converted to be matched with other visually distinctive indicators of the same color or with indicators (e.g., other types of indicators such as displays that display a color) that match the color.

In embodiments, a particular visually distinctive indicator may be selected as a color, shape, flashing, frequency of flashing or pattern or combination of one or more of color, shape, flashing, frequency of flashing and pattern. In other embodiments, a particular visually distinctive indicator may be selected from another visually distinctive characteristic or combinations thereof. Although a combination of one color or one pattern or one shape is contemplated, combinations of multiple colors with various patterns and/or with various shapes are also contemplated. In some embodiments, combinations of two or more of the visually distinctive characteristics are contemplated for any particular visually distinctive indicator.

Color-blindness may be taken into account. For example, colors for visually distinctive indicators may be selected only from a palette of colors that are discernible by those who are color-blind. In some embodiments, various patterns and/or shapes may be used in conjunction with certain colors in order to increase the fidelity of the signal indicated.

In some embodiments, the visually distinctive indicator will not require a machine for decoding. For example, bar codes may require a bar code reader to decode the identifier and/or convert the bar code into a human readable label for the item identified by the bar code. In a particular example, bar codes and identifiers like bar codes that require decoding do not designate a grouping without decoding of the bar code. Another disadvantage of bar codes and the like is that bar codes may not be readily observable by human observation due to their small size and particular placement, often in a single location that may be hidden, based on container orientation. In embodiments, the visually distinctive indicators of a system or enterprise are all human-discernible indicators that do not require a machine for decoding.

The visually distinctive portion of the indicator may be a color, pattern, illumination, graphic or other visual indicator, for example. In some embodiments, the visually distinctive indicator may be modified while on the package or container, for example, some types of color-changing tape change color when exposed to various temperatures or other processing such as electromagnetic radiation. In some embodiments, the visually distinctive indicator may be modified while en route, for example, with a wireless electronic controller or the like. In some embodiments, the visually distinctive indicator of a container may not be located directly on the container, but positioned near-to the container. For example, a docking bay may include a light that may be illuminated in any one of various colors to indicate the visually distinctive indicator that is assigned to the docking bay, thereby acting as the visually distinctive indicator for the shipping vehicle associated with the docking bay. Illumination of the light in a color matching the visually distinctive indicator of a group of packages may signal that only packages with a visually distinctive indicator that match the light are to be loaded onto the shipping vehicle at that particular docking bay, in one example.

Various groupings or groups may be defined by the grouping-based control system. In one example, containers may be grouped. For example, a number of input containers may be grouped into a grouping container to form a group of input containers. In another example, packages may be grouped into containers or other packages. In some embodiments, items may be grouped into packages or containers. Grouping containers filled with input containers may be input containers into large grouping containers, in various embodiments. Various other groupings are contemplated such as items grouped into packages that are further grouped into containers. For example, a product made by a manufacturer may place one or more products into product packaging and may place the product packaging with the items into a container such as a shipping container. Placing one or more of the shipping containers into a shipping transport such as on a train or ship is yet another example of the grouping that is contemplated without departing from the scope of the invention. In some embodiments, input containers may be grouped by characteristic such as HAZMAT contents, for example.

In some embodiments, the visually distinctive indicators may indicate containers that should not be grouped together. For example, lithium batteries may become more dangerous when grouped together. In some embodiments, the containers with lithium batteries may be indicated with a visually distinctive indicator that indicates such separation. For example, agents may be trained or automated systems such as a group analyzer (described below in FIG. 9) may be programmed with logic to recognize when two or more safety orange visually distinctive indicators are physically close to one another and separate the containers or issue a message such as an alert. In some embodiments, visually distinctive indicators may be used to prevent grouping.

As used herein, containers may denote packages or objects that can hold items. Containers may be empty or may contain packages or items or other containers. In some embodiments, a group of items, together in space, may be considered a container. For example, a grouping control system may process items, packages, containers or the like into virtual containers. In some embodiments, a virtual container may group packages, containers or items. For example, a painted box or other shape on the floor or just a particular area of the floor of the materials handling facility may serve as a virtual container that denotes the packages or containers placed within or on the shape or in the area as a group. In another example, a certain space or portion or entirety of a shelf may define a virtual container. In some embodiments, a container may be a marking on a floor, or a transport devices such as a pallet or wheeled cart and the like or collection of shrink-wrapped packages. In some embodiments items may themselves be a package or container, for example, large or unwieldy objects that do not lend themselves to additional packaging. Such objects may be input containers that are grouped into grouping containers.

A grouping control system may direct a group of input containers of a grouping container to be grouped into sub-groups such that one or more of the sub-groups may be grouped into another grouping container. For example, a national distributor may receive a shipment from a manufacturer, divide the shipment into sub-shipments and ship the sub-shipments out to various regional distributors. In some embodiments, the grouping control system may send instructions to a visual indicator applicator to modify the visually distinctive indicator that already exists on the sub-group of containers to indicate another distinctive color, pattern or the like. In some embodiments, the modified visually distinctive indicator may be assigned to another grouping container. In another example, an additional visually distinctive indicator (e.g., tape with another color) may be added to visually indicate the sub-group as distinct from the group it was divided from. In some embodiments, the grouping container may have been used to group two or more groups of input containers that each had distinct visually distinctive indicators (pre-subgrouping at the point of grouping determination and visual indicator application) such that the input containers can later be divided into two or more groups without the addition of any more visually distinctive indicators. For example, items in packages destined for two different regions of a country may be grouped and visually distinctive indicators may be applied to the two groups of the items such that the two groups exhibit distinct visually distinctive indicators. The two groups may be shipped together in the same container (e.g., a shipping container or plane) until they reach the destination country where the two groups may be removed from the same container and placed into separate containers that are assigned respective visually distinctive indicators so they may be shipped to their respective regional destinations.

A grouping control system may direct application of visually distinctive indicators to containers. In one embodiment, the grouping control system may direct automated application (e.g., may instruct a visual indicator applicator device to apply) of visually distinctive indicators to containers and, in another embodiment, the grouping control system may direct an agent to apply a visually distinctive indicator. For example, the grouping control system may send an instruction to be displayed to an agent, instructing the agent to apply a particular tape to a container.

In some embodiments, the grouping control system may direct a visually distinctive indicator to be modified. Modification may be performed either by an agent or my automation. For example, various materials lend themselves to color changes when exposed to radiation and the like. The materials may be applied to containers either by an agent or automation and the material may be subjected to radiation to modify the characteristics exhibited by the visually distinctive indicator, for example, to change its color.

A grouping control system may direct grouping of the containers in their respective groups. For example, the grouping control system may direct a group of containers with the same visually distinctive indicator to be placed on a pallet or in a shipping container for shipping. In other embodiments, the grouping control system may direct a group of containers to be sent to an area for processing.

The grouping control system may automate observation, comparison and determination of mis-sorted containers, in some embodiments. For example, the grouping control system may receive an image of a grouping container from an image capture device. The grouping control system may analyze the image of the grouping container to identify groups of containers and compare the members of the groups of containers to determine if any member of a group is missing a visually distinctive indicator or is exhibiting a different visually distinctive indicator from the group. If a missing or different indicator is determined, a message (e.g., an alert) may be sent. In some embodiments, an instruction to re-sort the container associated with the missing or different indicator may be sent by the grouping control system. In other embodiments, an agent may perform some or all of the container observation, comparison, mis-sort determination, alerting and/or re-sorting. For example, an agent that is loading a shipment at a docking bay may notice that one of the containers loaded as part of the shipment has a visually distinctive indicator that does not match the other containers that are already loaded on the shipment vehicle. The agent may remove the container with the non-matching visually distinctive indicator from the shipment.

Package or container may be used interchangeably throughout the detailed description and generally indicates a container that is capable of holding something within it, although it may be empty. A non-exhaustive list of example containers includes packages, boxes, totes, push-carts, trucks, pallets, shipping containers, tractor-trailers, train cars, ships and the like. Containers that are place into other containers may be referred to as input containers and containers that hold input containers may be referred to as grouping containers. In one example, a package may contain an item that is being shipped to an e-commerce retailer that advertises the item for sale. The retailer may remove the item from the package when placing the item into inventory or leave the item in the packaging for fulfillment. Containers may contain other containers, for example, a container truck may contain pallets of shipment containers that aggregate groups of orders. In another example, a virtual container may be an area on the facility floor. The area may be illustrated on the floor of the facility as a box or other shape that indicates the container, in some embodiments. The illustrated shape may be of a particular color or pattern or denoted by a label such as an alpha-numeric label or some other visual indicator such as a picture or drawing. Generally, a visually distinctive indicator may be used to denote any operational process as an aggregate decision for a group with the same visually distinctive indicator. For example, a color may be applied to a package or container as an indication that the package or container belongs to a group of packages or containers or should be placed into another container or processed according to a process associated with the color.

The methods described herein may in various embodiments be implemented by any combination of hardware and software. For example, in one embodiment, the methods may be implemented by a computer system that includes a processor executing program instructions stored on a computer-readable storage medium coupled to the processor. The program instructions may be configured to implement the functionality described herein (e.g., the functionality of the control system, product database, mobile devices, and/or other devices such as scanners, for example).

Various processes and devices associated with application and analysis of visually distinctive indicator to facilitate detection of grouping errors are disclosed. FIG. 1 illustrates a shipping area in a materials handling facility in which embodiments of a system and process for application and analysis of visually distinctive indicators to facilitate detection of grouping errors may be implemented, according to some embodiments. As illustrated in FIG. 1, a docking bay associated with a shipping vehicle may be associated with a visual display (e.g. visual display 22 or 32) that displays a visually distinctive indicator (e.g., shipment ID) for the respective docking bay. Containers (e.g., outgoing shipments 20 or 30) that exhibit a visually distinctive indicator that matches the shipment ID on the visual display of the docking bay may be loaded onto the shipping vehicle as outgoing shipments. In some embodiments, a visual display, like visual displays 22 or 32 may also display other information associated with either or both of the input containers or the grouping container. For example, a visual display that is associated with a grouping container and matches the visually distinct indicator may indicate a destination or a process associated with the visually distinct indicator. In one example, a docking bay visual indicator may display the associated destination.

As illustrated in FIG. 1, each docking bay may be associated with an image device that captures images of the input containers (e.g., containers 20a-20d) and the grouping container (e.g., the shipping vehicle) of the docking bay. FIG. 1 also illustrates that for the outgoing shipments 30 associated with visual display 32 of the other docking bay; all of the containers 30a-30e exhibit that same visually distinctive indicator. In some embodiments, the same dock may be used for different purposes. For example, the docking bay associated with visual display 22 is illustrated as being used for outgoing shipments, but may also be used for incoming shipments or may be used to load shipping vehicles destined for different destinations.

A control system (e.g., a grouping control system) may receive the captured images, analyze the images to compare containers in a group of containers (outgoing shipments 20) to determine any containers that don't exhibit the same visually distinctive indication (e.g., 20c) as the others in the group (e.g., 20a, 20b, 20d and 20d) and issue a message (e.g. an alert) of a mis-sort. In some embodiments, an agent loading the shipping vehicle may observe that one of the containers (e.g., container 20c) exhibits a visually distinctive indicator that does not match the other visually distinctive indicators of the other containers (e.g., 20a, 20b, 20d and 20d) in the shipping vehicle. As illustrated, container 20c has been mis-sorted into the outgoing shipments associated with visual display 22 by mistake. The control system may determine the mis-sort as described above and issue an alert or notification of the mis-sort of container 20c. In some embodiments, an agent may notice the mis-sort and move container 20c to the shipping vehicle associated with visual display 32 that has a shipment ID that matches the visually distinctive indicator of container 20c.

FIG. 1 illustrates visual displays 22 and 32 as displays on the wall above a docking bay door. In other embodiments, other types of indicators may be associated with respective docking bays. For example, a light matching the color of the visually distinctive indicator associated with the containers being loaded at the docking bay may illuminate the interior of the shipping vehicle such that agents loading the shipping vehicle may match the color of the light, or a light may hang from the ceiling in front of the docking bay so that an agent in the shipping vehicle may look out into the shipping area and see the color of the light.

Figure 2:
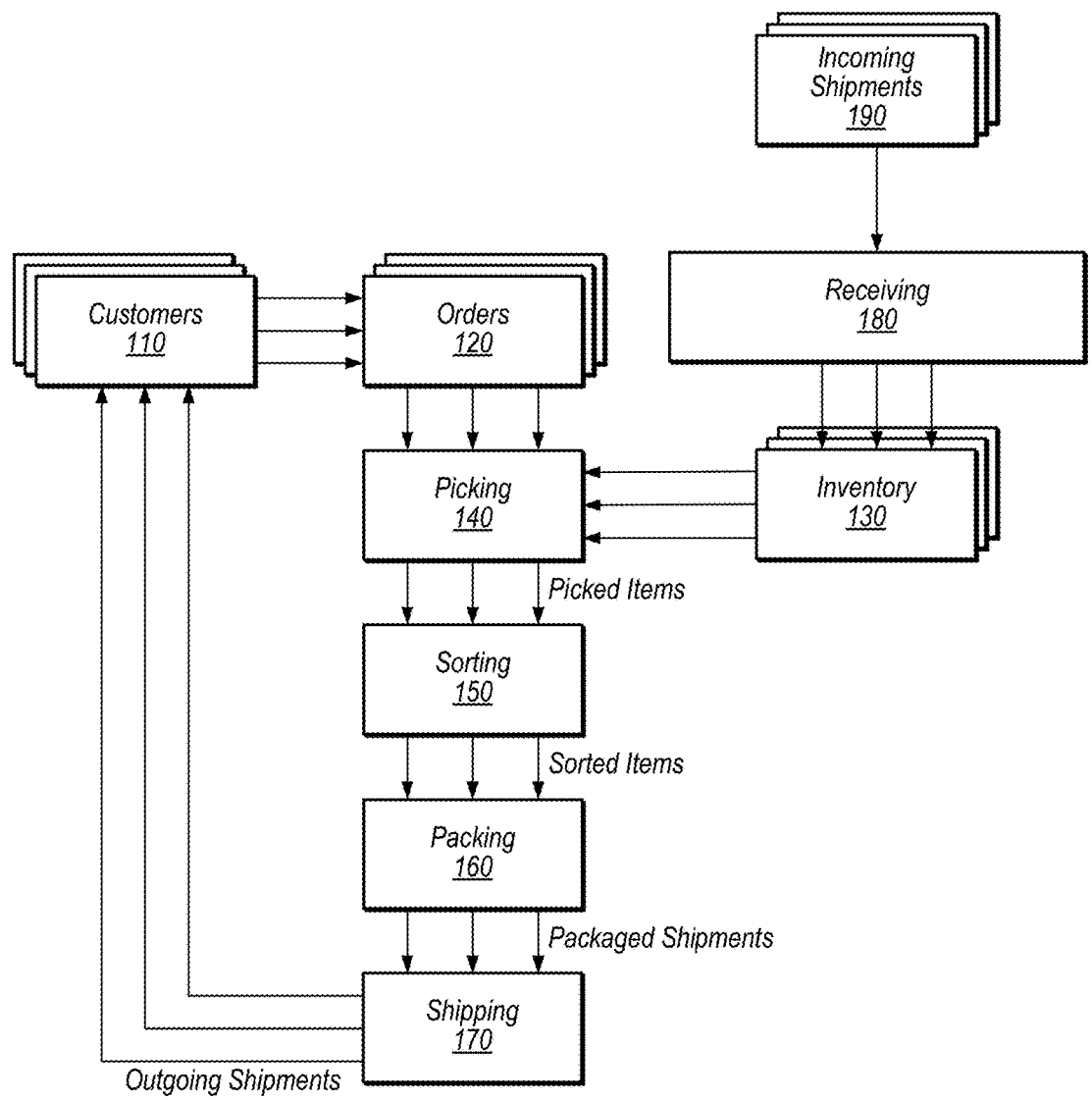
FIG. 2 illustrates a logical representation of various operations of a materials handling facility, according to some embodiments.

FIG. 2 illustrates a logical representation or view of the operation of a materials handling facility in which various embodiments may be implemented. For example, this Figure may illustrate a materials handling facility of a product distributor or e-commerce enterprise with a network-based site. Multiple customers 110 may submit orders 120 to the product distributor, where each order 120 specifies one or more items from inventory 130 to be shipped to the customer that submitted the order. To fulfill the customer orders 120, the one or more items specified in each order may be retrieved, or picked, from inventory 130 (which may also be referred to as stock storage) in the materials handling facility, as indicated at 140. Picked items may be delivered or conveyed, if necessary, to one or more stations in the materials handling facility for sorting 150 into their respective orders, packing 160, and finally shipping 170 to the customers 110. In various embodiments, picked items may be delivered to an induction station, where the items are inducted into a sorting system (e.g., a sorting mechanism, sorting process, or some combination thereof). The items may then be routed to particular destinations in accordance with the requests (orders) currently being processed, e.g. to sorting stations, under direction of the control system. Various sorting mechanisms and processes (which may be represented by sorting 150) are described in more detail below. Not all sorting operations are necessarily performed at sorting stations 150. Sorting may be performed in any area of a facility, in various embodiments and may be performed in an order other than illustrated. In embodiments, sorting may be associated with processes not illustrated. A picked, packed and shipped order does not necessarily include all of the items ordered by the customer; an outgoing shipment to a customer may include only a subset of the ordered items available to ship at one time from one inventory-storing location. In other cases, items of the order may be split into multiple shipments for a variety of reasons including but not limited to space and/or economic efficiency. For instance, shipping a set of items in three small shipments may be less expensive than shipping the set of items in one large shipment. In embodiments, a sort operation may be performed during or immediately before shipping 170. In some embodiments, sorting may be a type of grouping.

A materials handling facility may also include a receiving 180 operation for receiving shipments of stock from one or more sources (e.g., vendors) and for placing the received stock into stock storage. The receiving 180 operation may also receive and process returned purchased or rented items or orders from customers. At least some of these items are typically returned to inventory 130. The various operations of a materials handling facility may be located in one building or facility, or alternatively may be spread or subdivided across two or more buildings or facilities.

The arrangement and order of operations illustrated by FIG. 2 is merely one example of many possible embodiments of the operation of an order fulfillment facility utilizing a grouping-based control system. Other types of materials handling, manufacturing, or order fulfillment facilities may include different, fewer, or additional operations and resources, according to different embodiments.

Figure 3:
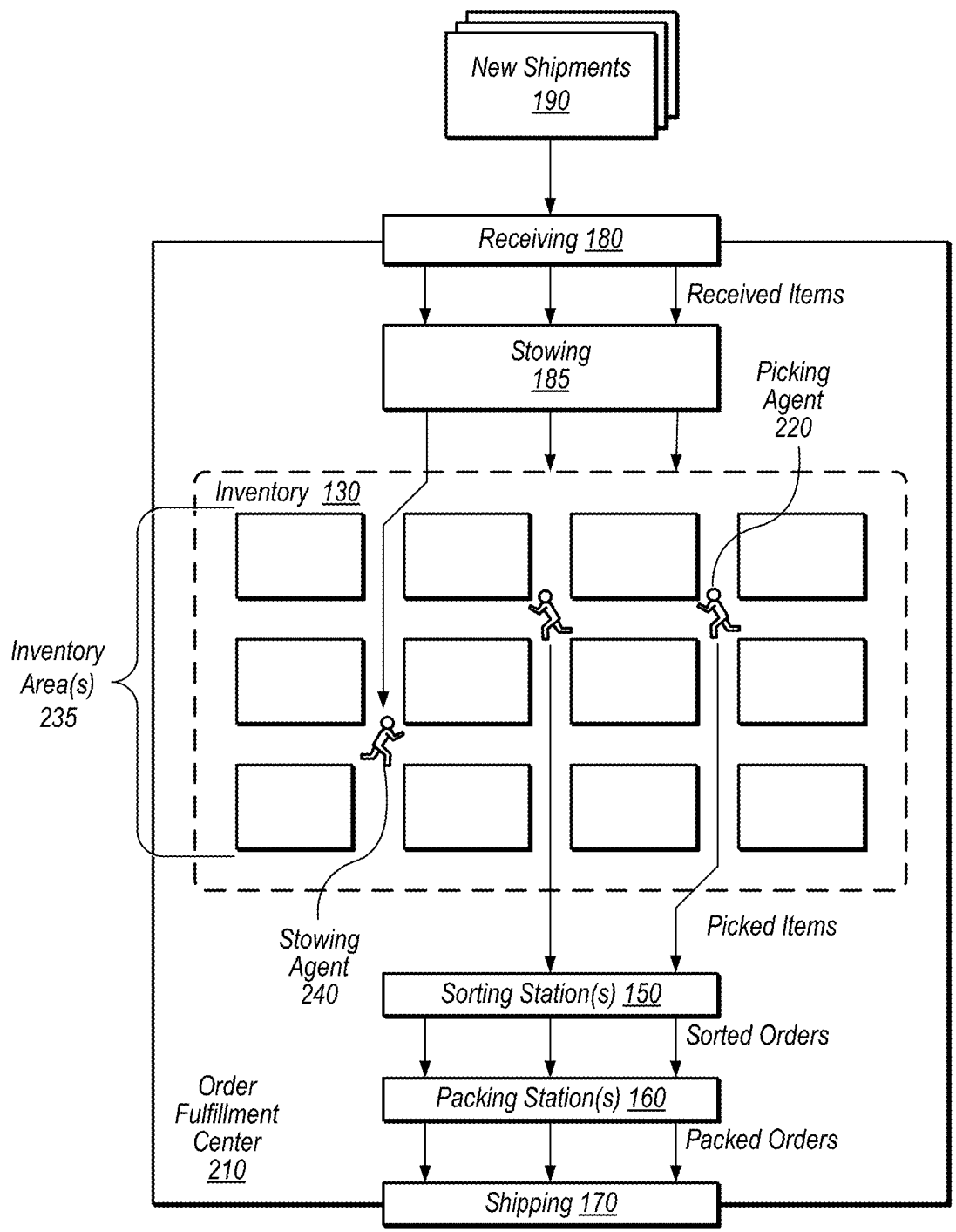
FIG. 3 illustrates a high-level physical layout of a materials handling facility, according to one embodiment

The stations of an order fulfillment center may be arranged in many different configurations, according to various embodiments. FIG. 3 illustrates an arrangement for an order fulfillment center 210, according to one embodiment. At any time, one or more picking agents 220 may each be picking items from inventory 130 to fulfill portions or all of one or more orders, and/or one or more stowing agents 240 may be placing items in inventory 130. It is contemplated that picking agents 220 and/or stowing agents 240 may perform either or both of picking or stowing operations or other operations.

Figure 4:
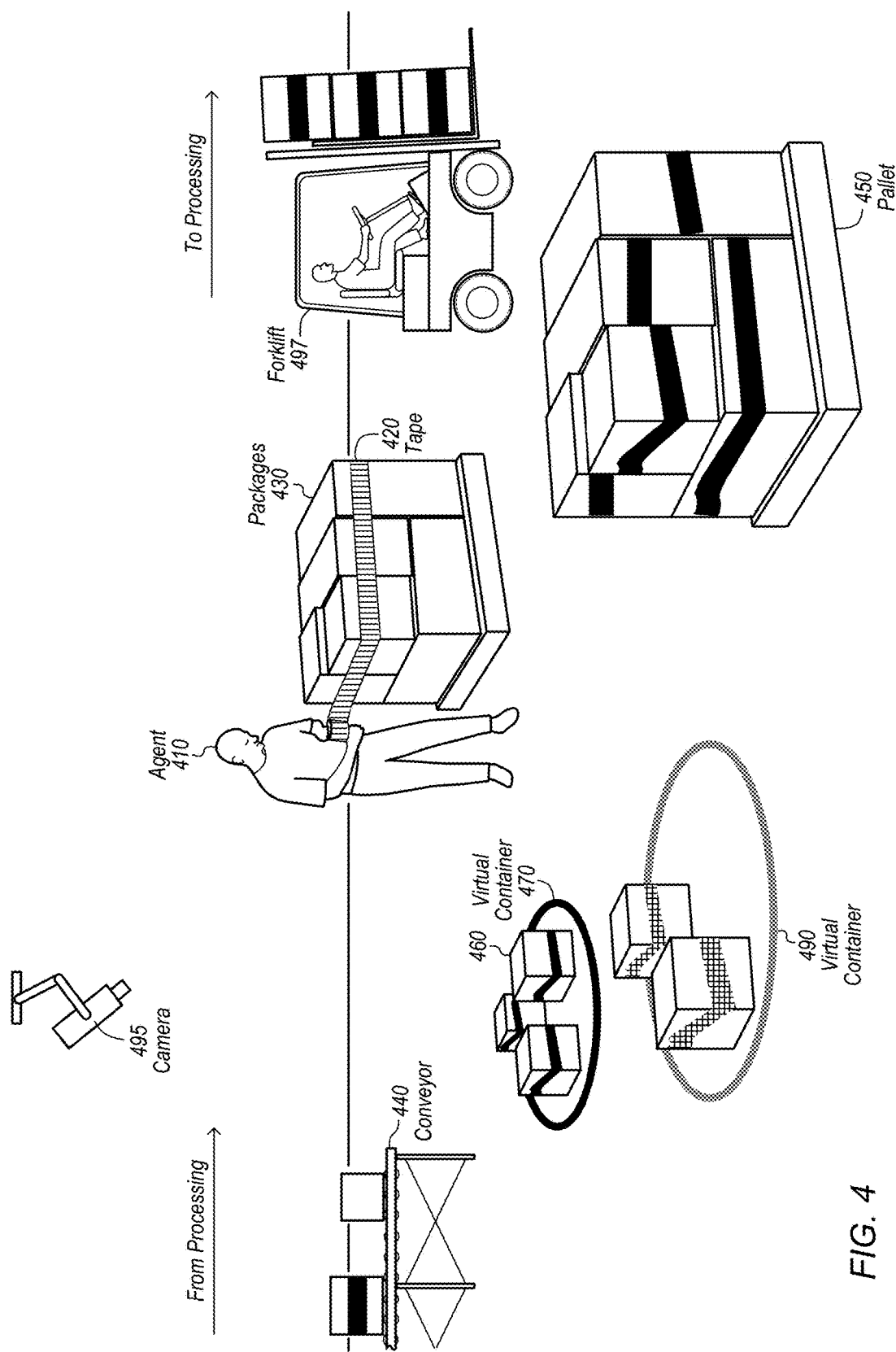
FIG. 4 illustrates an example of a process for application and analysis of visually distinctive indicators of containers, according to some embodiments.

After obtaining items from inventory 130, picking agents 220 may transfer those items to sorting stations 150, according to one embodiment. Not every fulfillment facility includes both sorting and packing stations. In certain embodiments, agents may transfer picked items directly to a packing station, such as packing station 160, and the picked items may be directed to a particular packing station by a control system. In other embodiments, agents may transfer picked items to a combination sorting and packing station (not illustrated). This may result in a stream and/or batches of picked items for multiple incomplete or complete orders being delivered to a sorting station 150 for sorting into their respective orders for packing 160 and shipping 170, according to one embodiment illustrated by FIG. 3. Portions of an order may be received at different times, so sorting 150 and packing 160 may have to wait for one or more items for some orders to be delivered to the sorting station(s) 150 before completion of processing of the orders. A stream or batches of incoming picked items may be sorted into their respective orders at the sorting station(s) 150. While, in some embodiments, automated sorting may be utilized, such as through the use of Crisplant® or Eurosort® sorters, in other embodiments sorting may be performed manually. In yet other embodiments, both manual and automatic sorting may be used in combination. Once an order is completed at a sorting station 150, the order may be ready to proceed to a packing station 160 to be packaged for shipping 170. According to some embodiments, a grouping-based control system may direct packed packages to a visually distinctive indicator applicator device (e.g., 750 in FIG. 7) or direct an agent to apply a visually distinctive indicator to the packed packages (as illustrated in FIG. 4) for example.

In some embodiments, visually distinctive indicators may be applied to containers coming from any type of processing or going to any type of processing, for example any of the processing illustrated in FIG. 3.

Figure 9:
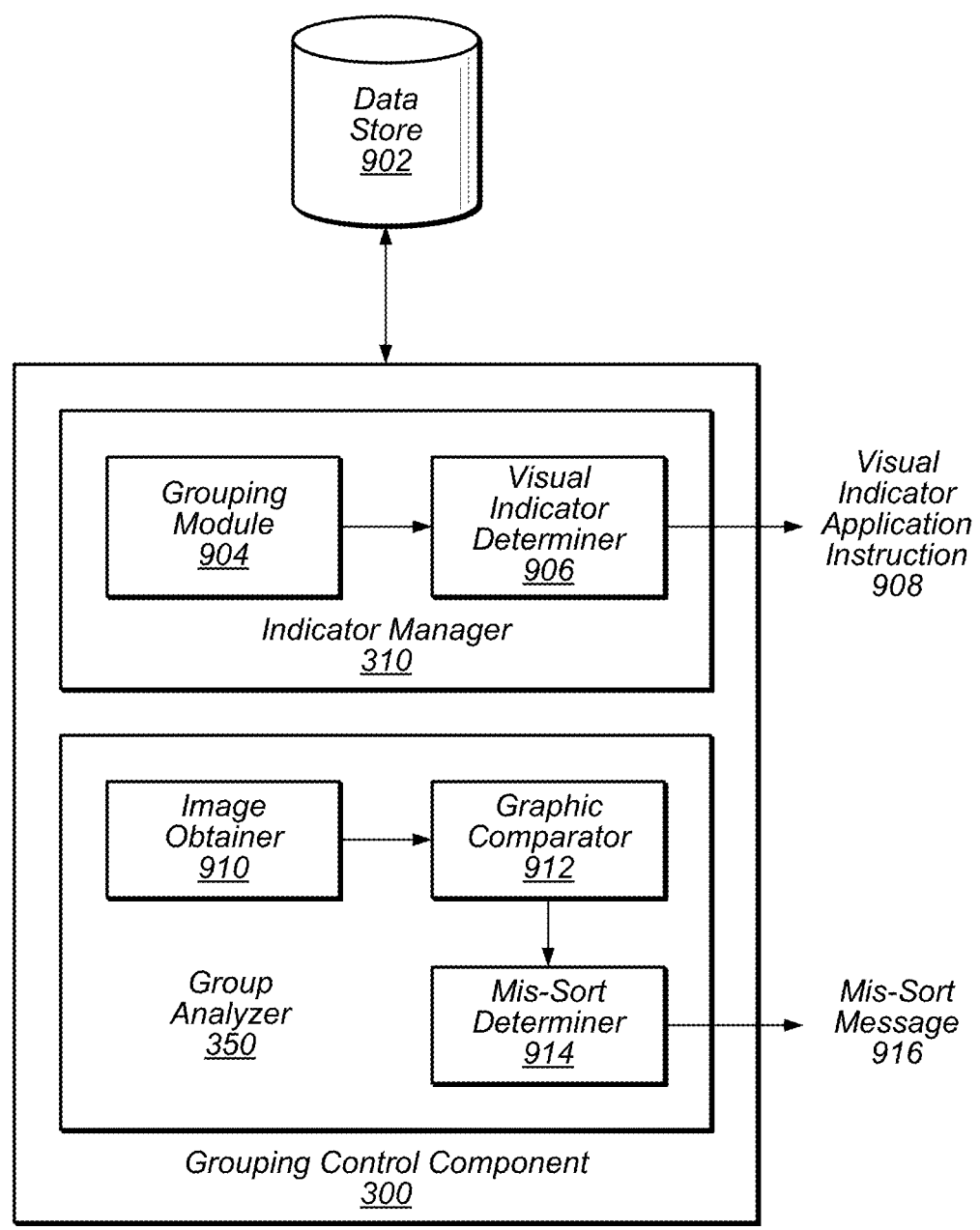
FIG. 9 illustrates a control system, according to some embodiments.

An order fulfillment facility such as an order fulfillment center 210 may implement a grouping-based control system, or control system for short, as part of its overall inventory management system. A control system (such as illustrated in FIG. 9 and described below) may include hardware and software configured for assisting and/or directing agents in the order fulfillment center 210 in fulfilling customers' orders. For example, in some embodiments, such a control system may instruct identification of a particular container, grouping of the container, identification of a visually distinctive indicator for the container and application of the visually distinctive indicator to the container. In some embodiments, the control system may receive images of the containers and determine if any of the containers in the image have been mis-sorted such that a message (e.g., an alert) may be issued notifying one or more agents or others of the mis-sort. The control system may direct an agent to correct the mis-sort, in some embodiments.

Items in inventory 130 may be marked or tagged with a bar-code, radio frequency identification (RFID) tag, Universal Product Code (UPC), Stock-Keeping Unit (SKU) code, serial number, and/or other designation (including proprietary designations) to facilitate order fulfillment center 210 operations, including, but not limited to, picking 140, sorting 150 and packing 160. These designations, or codes, may identify items by type, and/or may identify individual items within a type of item. The control system may also include, or may be used in conjunction with, handheld, mobile and/or fixed scanners or scanning devices that may be able to scan the marks or tags on individual items and/or inventory areas 235 to determine and record an identifier of an item and/or an item location. In some embodiments, a control system may be configured to access location, position and/or descriptive information for items (e.g., from a product database or other data store) and may provide this information to picking agents 220 along with other information indicating items to be obtained from inventory. Inventory locations may also be marked in a similar fashion.

The control system may, in some embodiments, be configured to determine the location and/or position of a picking agent 220 or a stowing agent 240 (e.g., using an indirect asset tracking device or other communication device worn or carried by the agent) and may generate instructions to perform operations (e.g., stowing or picking instructions for the agent) that are dependent on the agent's current location within inventory 130. For example, the control system may transmit messages including instructions for the agent to a mobile device that is near the agent, and this mobile device may display information suitable for directing the agent from his or her current location to the location of an item to be picked or stowed.

Many fulfillment facilities store different copies of items in different individual inventory areas within stock storage. Storing copies of items in multiple inventory areas may shorten the distance, and therefore the time, required to obtain an item from inventory, in some embodiments. Additionally, different items may be stored in a single inventory area, according to certain embodiments. Storing different items together may result in more efficient use of total inventory space than using a single inventory area for multiple copies of a single item or product. It still may be beneficial in some embodiments to store similar items together to make better use of inventory space. For example, storing different books together on a single inventory shelf may use the available inventory space more efficiently than storing one book among other items of greatly differing size and shape, such as electronic devices, clothing, toys, hardware, materials, or other items. Thus, in some embodiments, a fulfillment facility may store items of similar shape and size together in a single inventory area. For instance, in such an embodiment, items such as books, compact discs (CDs), and digital video discs (DVDs) may all be stored together. In some embodiments, multiple copies of an item may be stored together with multiple copies of other, different items. For example, a single inventory area may store multiple copies for each of several different books, CDs, or other items.

In certain embodiments, items may be randomly stored together in inventory areas. Such random storage may increase storage efficiency and may in some cases increase the likelihood that any individual item may be easily distinguished from the other items with which it is stored. Random storage of items may also decrease the amount of time needed to store individual items into inventory. A control system for the facility may track where each item is stowed. In some embodiments, determining where to store an item may be performed manually, while in other embodiments, it may be an automated process performed by one or more computer software programs based on pattern information associated with the individual items, and/or based upon positional placement guidelines, as described below.

FIG. 4 illustrates an example of a process for application and analysis of visually distinctive indicators, according to some embodiments. FIG. 4 also illustrates an area for grouping containers coming from processing and/or going to processing. In some embodiments, processing may be any type of processing, for example, processing associated with manufacturing or distributing or servicing, for example. Note that the illustrated embodiment is not necessarily drawn to scale. Also note that in various embodiments the position and/or orientation of the various elements may be different than that illustrated by FIG. 4.

As illustrated, agent 410 is applying a striped tape 420 to packages 430. In some embodiments, applying the striped tape 420 in such a manner may indicate that all of the packages 430 grouped together by the tape on the pallet are of the same group and are all identified by the striped tape 420. Also illustrated in FIG. 4, conveyor 440 conveys containers from processing such that agent 410 may place the containers (e.g., container 460) in groups denoted by the virtual containers 470 and 490 illustrated as circles on the floor of the facility. In some embodiments, virtual containers may act as a staging area for grouping containers for further processing.

Pallet 450 is illustrated in FIG. 4 with containers that are individually-wrapped with a solid tape. In some embodiments, the tape on each package may indicate that the packages with the same tape are all of the same group. In other embodiments, the pallet itself (e.g. a colored pallet, not illustrated) may act as a visually distinctive indicator of a group for containers placed on the pallet even for containers without any other visually distinctive indicator such as solid tape, for example. Forklift 497 is illustrated in FIG. 4 as moving container with the same solid tape to processing. In some embodiments, the forklift itself may act as a grouping container, on which input containers are grouped, even when the containers are not otherwise grouped, for example, with solid tape. In some embodiments, the forklift may exhibit a visually distinctive indicator that may be matched to visually distinctive indicators of containers As illustrated in FIG. 4, camera 495 may capture images of groups of containers that may be analyzed by a grouping control system to determine a mis-sort. In some embodiments, agent 410 may observe the groups of containers illustrated and may re-sort containers that do not exhibit the same visually distinctive indicators as the other containers in the physical group (not illustrated).

In some embodiments, visually distinctive indicators may be removed, for example, before shipping a container to a customer or when the container is being sent onto another facility (e.g., another facility that also uses visually distinctive indicators may confuse the indicator if it is not removed).

Figure 5:
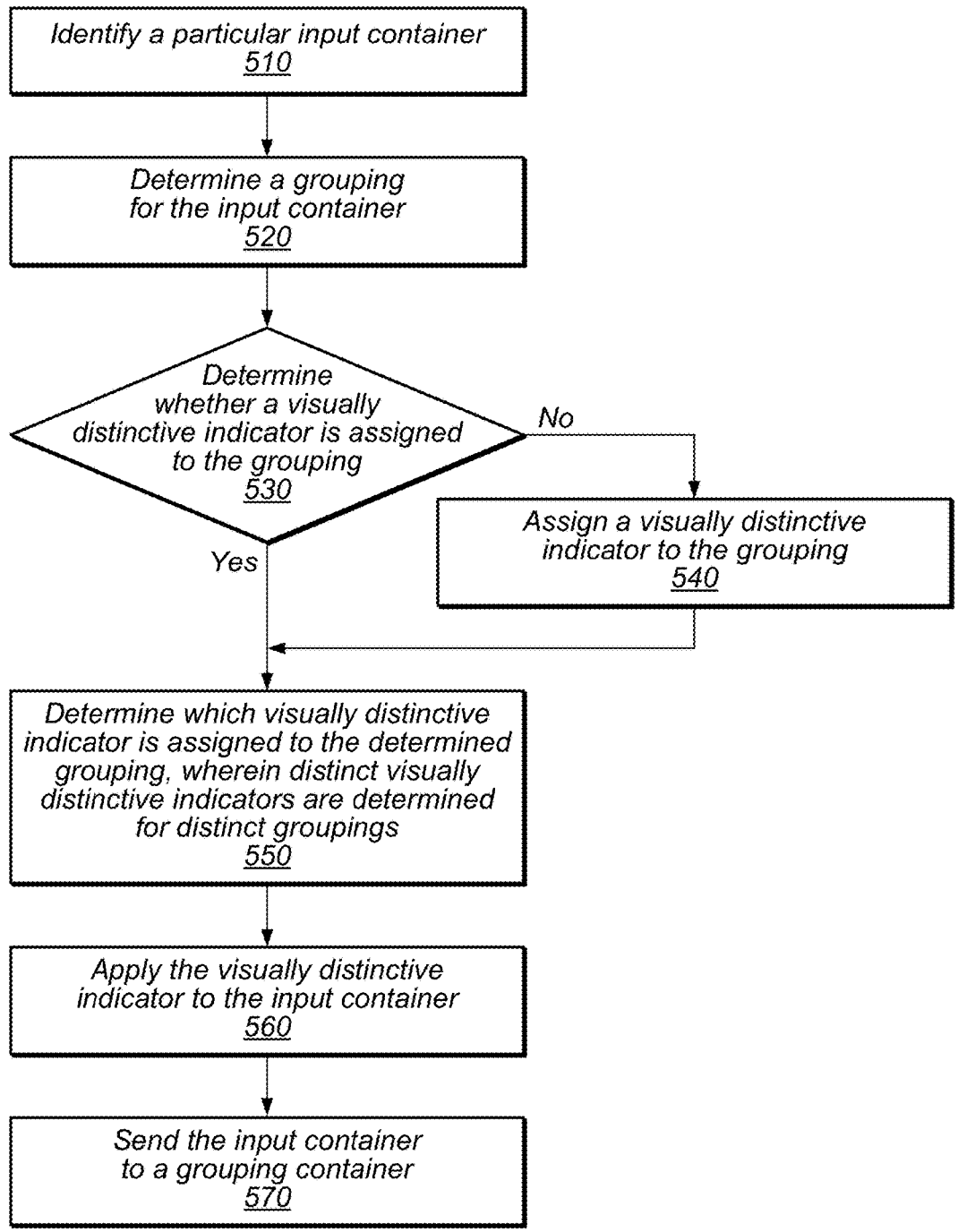
FIG. 5 illustrates a flowchart of an example method for application of visually distinctive indicators, in various embodiments.

FIG. 5 illustrates a flowchart of an example method for application of visually distinctive indicators, in various embodiments. In various embodiments, some or all of the process described in FIG. 5 may be implemented in an automated or manual fashion. In some embodiments, the process described in FIG. 5 may be implemented by a control system (e.g., the grouping control system illustrated in FIG. 9 and described, below).

FIG. 5 illustrated that at block 510, a particular input container is identified, by an agent or a grouping control system for example. In some embodiments, a container may be identified by a label, by size, a tracking device or otherwise. At block 520, a grouping for the input container is determined. For example, a grouping control system may determine that the identified input container is part of a group of containers that are associated with a particular process, such as any of various order fulfillment center processes (e.g., shipping) or with a manufacturing process. In some embodiments, the grouping control system may determine that the input container is part of a group of containers to be shipped via a particular shipping channel, such as an expedited shipping channel, for example. In some embodiments, the determination and/or indication of what group the input container belongs to may come from outside the grouping control system.

At block 530, it is determined whether a visually distinctive indicator is assigned to the grouping. In some embodiments, if a visually distinctive indicator has not been assigned to the grouping, a visually distinctive indicator may be assigned to the grouping, as indicated at block 540. If a visually distinctive indicator has already been assigned to the grouping, the grouping control system may determine which visually distinctive indicator is assigned to the determined grouping, as distinct visually distinctive indicators are determined for distinct grouping, as indicated at block 550. For example, if the grouping has already been assigned a particular color or pattern or the like, the control system may determine which particular color or pattern or the like has been assigned to the grouping.

As illustrated in FIG. 5, at block 560, the determined visually distinctive indicator may be applied to the input container. For example, an agent may apply the particular color or patter or the like to the input container or an automated process may apply the particular color or pattern or the like to the input container. In some embodiments, the grouping control system may direct the agent or an automated device to apply the visually distinctive indicator. In some embodiments, more than one indicator may be applied. For example, an agent or an automated machine may apply two or more indicators to a container at a time. In some embodiments, the indicators may be used to indicate two different groups, each group at a different destination for example. The input container may be sent to a grouping container, as illustrated at block 570. For example, the grouping control system may direct an agent or equipment such as a conveyor or forklift to send the input container to a grouping container. In some embodiments, the input container may be a shipment and the grouping container may be a shipping container. The shipping container may be illuminated with a color or pattern or the like that matches the visually distinctive indicator applied to the input container. The process illustrated in FIG. 5 may be repeated for numerous input containers.

Figure 6:
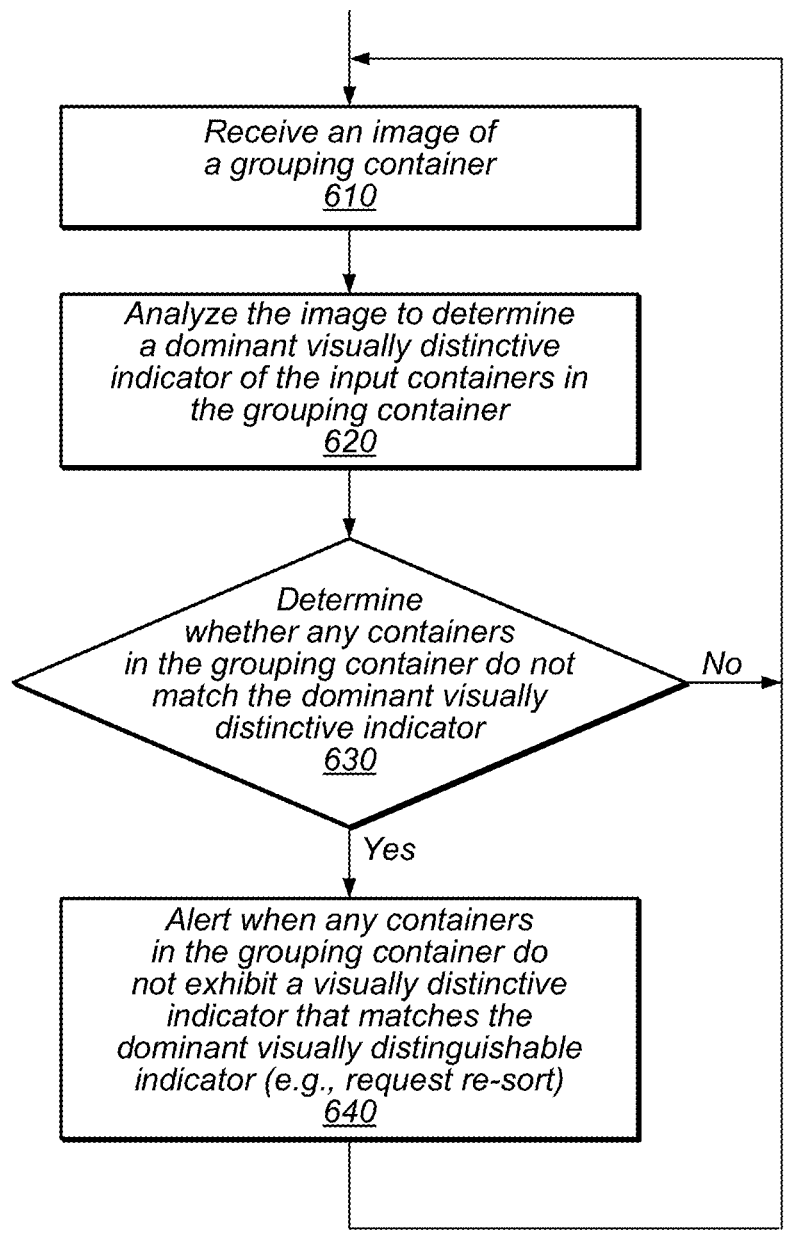
FIG. 6 illustrates a flowchart for analysis of visually distinctive indicators to facilitate detection of grouping errors.

FIG. 6 illustrates a flowchart for analysis of visually distinctive indicators to facilitate detection of grouping errors. In some embodiments, the processes illustrated in FIG. 6 may be performed in conjunction with the processes illustrated in FIG. 5. In other embodiments, the two processes may be performed without coordination. In various embodiments, some or all of the process described in FIG. 5 may be implemented in an automated or manual fashion. In some embodiments, the process described in FIG. 5 may be implemented by a control system (e.g., the grouping control system illustrated in FIG. 9 and described, below).

At block 610, an image of a grouping container is received. In some embodiments, the image may have been captured by an image device such as illustrated in FIG. 1, or by camera 495 in FIG. 4, for example. The image capture device may be instructed by the control system to capture the image or the image capture device may send captured images without instruction from the control system. Embodiments for capturing and sending both still images and video images are contemplated without departing from the scope of the invention.

As illustrated at block 620, the image is analyzed to determine a dominant visually distinctive indicator of the input containers in the grouping container. In some embodiments, the grouping control system may analyze the image to determine the dominant visually distinctive indicator. Any of various recognition techniques may be used. Some grouping recognition techniques may rely upon analyzing the distance among containers or analyzing a particular area where a group of input containers are expected (e.g., the area in from of a loading dock) to determine a grouping, for example.

Block 630 illustrates that a determination whether any containers in the grouping container do not match the dominant visually distinctive indicator is made, by the grouping control system, for example. If there are not any containers in the grouping container that do not match the dominant indicator, the process may return to 610, as illustrated, and repeat the process with a new image, for example. If a container in the grouping container does not match the dominant visually distinctive indicator, a message (e.g., an alert) may be indicated. For example, as indicated at block 640, the control system may alert when any containers in the grouping container do not exhibit a visually distinctive indicator that matches the dominant visually distinctive indicator. Various responses to recognition of the mis-match are contemplated, for example, the grouping control system may instruct or request a re-sort and/or an agent may perform a re-sort of the mis-matched container. In other embodiments, the control system may request that the mis-matched container be re-sorted during later processing.

Figure 7:
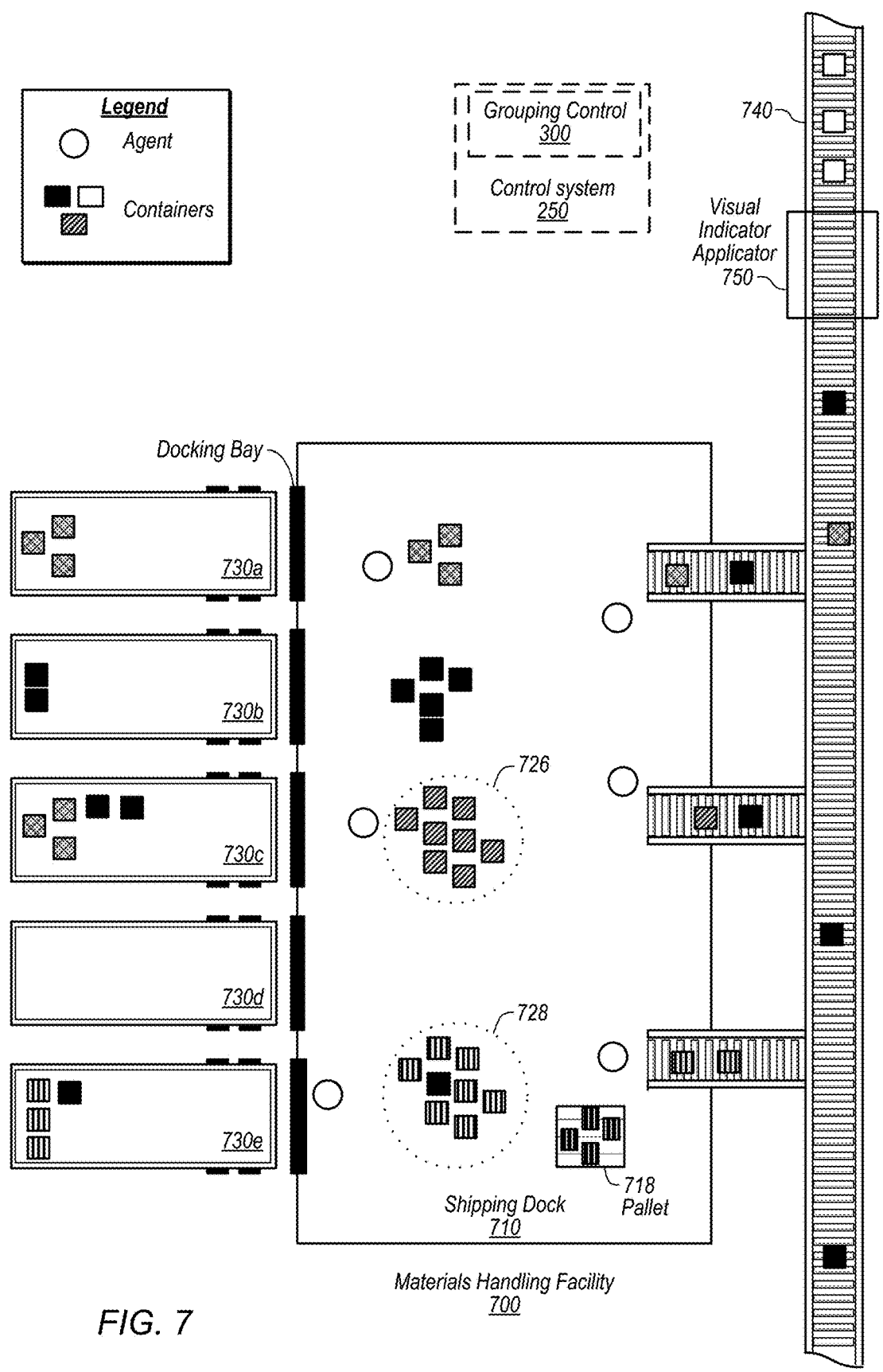
FIG. 7 illustrates a materials handling facility that may implement a system and process for application and analysis of visually distinctive indicators to facilitate detection of grouping errors in some embodiments.

FIG. 7 illustrates a physical representation of the premises of a materials handling facility. Note that the illustrated embodiment is not necessarily drawn to scale. Also note that in various embodiments the position and/or orientation of the various elements may be different than that illustrated by FIG. 3. It is contemplated that the conveyor 740 may convey containers and the like from other areas of the facility and other types of facilities as well. In some embodiments, the conveyor 740 may enter materials handling facility 700 through an inbound door (not illustrated) from a sort center or sort station, for example.

In the illustrated embodiment, each of multiple vehicles is illustrated in various states of a loading or unloading process for transporting a respective load to or from materials handling facility 700. Each of the illustrated vehicles 730 (e.g., vehicles 730a-g) carries or transports a load of one or more containers (e.g. items, packages or shipments) to or from the materials handling facility. According to various states of a load arrival process, an inbound load may have arrived at the premises on which the materials handling facility is located (e.g., as denoted by the dashed "facility boundary" line) and has arrived at the actual fulfillment center.

Note that in various embodiments, the location of a load, vehicle, or driver of the vehicle may be tracked using one or more positioning technologies. For example, in various embodiments, the Global Positioning System (GPS) may be used to track a load, such as a load en route to the materials handling facility. For example, the load or a container of the load (which may be the vehicle transporting the load) may be tagged with a GPS tag such that the load can be tracked with a 2-way GPS receiver, which may be integrated into the control system of the materials handling facility. In other embodiments, other positioning methods or technologies (e.g., cellular tower triangulation) may be utilized by control system 250 in order to track the location of a load, whether such technologies and methods are presently known or developed in the future.

Note that while the illustrated vehicles resemble a truck and trailer combination (in which case the trailer would carry the respective load), a variety of other types of vehicles may be utilized in various embodiments. For example, automobiles, cargo vehicles, airborne vehicles, railway vehicles, and any other mobile vehicle may be utilized in various embodiments. In some embodiments, a vehicle may be as simple as a container configured to hold one or more containers. One example of such a vehicle may include an enclosed trailer which may be moved about by a separate conveyance mechanism, such as a truck. In cases where the vehicle itself is not mobile, the vehicle may be moved about by a separate conveyance system (e.g., a series of conveyors, lifts, etc.).

In various embodiments, a truck arrives at an entry point of the materials handling facility, as illustrated by vehicles 730a-e docked at dock 710. In many (but not necessarily all) embodiments, from the point at which a given load is shipped to or from the materials handling facility to the point at which the given load arrives at an entry point of the materials handling facility, or at a destination, the given load may travel as single, cohesive unit (e.g., within a truck trailer or other container). However, in many embodiments, when the load arrives at the entry point of the materials handling facility, the materials handling facility (e.g., the agents, mechanisms, or processes of the materials handling facility) may process disparate portions of the load differently. For instance, instead of handling the load as a single, cohesive group of containers (as is the case in many embodiments during the transport of the load to, from, or in between materials handling facilities), the materials handling facility may process each of the containers of the load as separate individual units. In other cases, the materials handling facility may process at least a portion of the load as separate groups of containers. In some cases, such groups may be selected by an agent or by the control system of the materials handling facility. In other cases, such groups may be specified by the manner in which the load is stored in its respective vehicle. For example, in some cases, containers of the load may be subdivided into groups of containers on or in a respective platform (e.g., a pallet) or container (e.g., a crate).

FIG. 7 illustrates containers being conveyed on conveyor 740 past a visual indicator applicator 750 and to individual chutes that feed shipping dock 710. In some embodiments, the conveyor may convey containers from packing stations (e.g., packing stations 160 of FIG. 3). Visual indicator applicator may be instructed by grouping control 300 of the control system 250 to apply visually distinctive indicators to the containers as they pass down the conveyor. The containers exiting the visual indicator applicator exhibit various shades of grey or stripes or cross-hatching as evidence of the applications of a visually distinctive indicator. Various mechanisms (e.g., a shoe sorter) may then direct containers to particular chutes where agents or devices (e.g., forklifts) may move the containers onto other containers (e.g., pallet 718) or to staging areas (e.g. staging areas 726 or 728) or directly into respective vehicles 730. Staging areas 726 and 728 are illustrated as dotted circles to indicate where the staging areas are in the illustration. The dotted circles are not actually part of the shipping dock (e.g., not painted on the floor) as illustrated. However, in some embodiments, virtual containers such as those depicted in FIG. 4 and described above, may be part of the shipping dock. As the agents or devices move the containers from the chutes to the vehicles 730, the containers may be grouped together, for example in staging areas. In some embodiments (not illustrated) vehicles 730 may not have arrived at a docking bay yet or the containers may need to be organized before being placed into the vehicles 730, for example, to facilitate unloading the containers at various locations along a delivery route.

In FIG. 7, staging area 728 illustrates that errors may occur during grouping of containers. In staging area 728, a single black container stands out among a group of striped containers. In some embodiments, an image capture device may capture an image of staging area 728 and group analyzer 350 may analyze the image to determine whether any of the indicators of the containers in the staging area 728 do not match the other indicators of the other containers in the same staging area. In the illustrated embodiment, group analyzer 350 would recognize that the black container is different from the dominant striped indicators of the other packages and issue a message (e.g. an alert). In some embodiments, the alert would be directed to an agent via a communication device such that the agent is instructed to re-sort the black container.

As illustrated, shipping vehicle 730e has been loaded with three containers with striped indicators and a single container with a black indicator. In some embodiments, the agent that is loading the truck may notice the mismatch and determine that the container with the black indicator does not belong in the shipping vehicle because the dominant indicator in the shipping vehicle is the striped indicator. The agent may re-sort the container with the black indicator back out onto the floor. In another embodiment, the agent may notice that a shipping indicator associated with the shipping vehicle and the docking bay displays a shipment ID (e.g. black) and may re-sort the containers with the striped indicators back onto the shipping dock floor.

In some embodiments, the shipping dock 710 may be used to move containers from one of the vehicles into two or more of the other vehicles. For example, vehicle 730c may have arrived at the materials handling facility with the black and gray containers depicted at the rear of vehicles 730b and 730a. Agents may have unloaded the black and gray containers from vehicle 730c and may be in the process of separating the containers by color before loading the black containers onto vehicle 730b and the gray containers onto vehicle 730a. In some embodiments (not illustrated) the containers that are removed from a vehicle may have new or additional visually distinctive indicators applied or their indicators may be modified, thus designating the containers as part of a new group or as part of several different groups.

Figure 8:
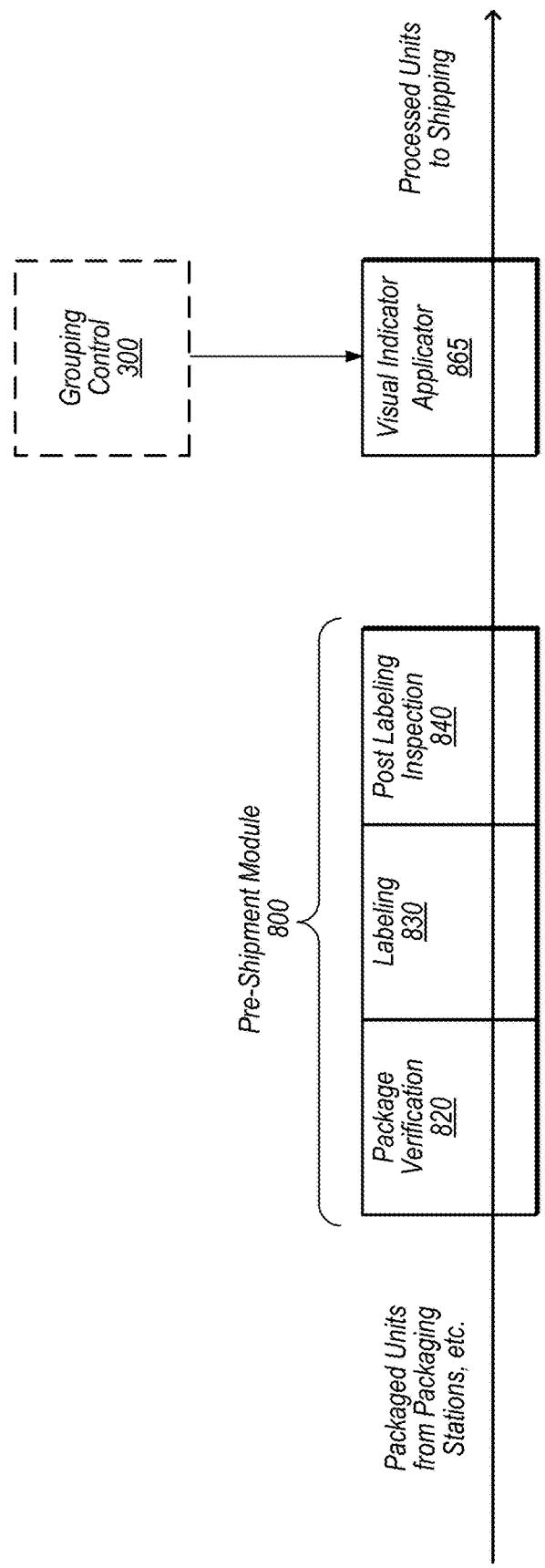
FIG. 8 is a block diagram of a process that may be associated with application and analysis of visually distinctive indicators in embodiments.

FIG. 8 is a block diagram of a process that may be associated with application and analysis of visually distinctive indicators in embodiments. FIG. 8 is an example illustration of application of a visually distinctive indicator to a container subsequent to other processing. As illustrated, packaged units (e.g., packages or containers) from packaging stations or elsewhere may pass through a pre-shipment module 800. While passing through the pre-shipment module, the packages may be verified as indicated at 820. For example, an agent or an automated device may verify that the package contains a particular item that the package characteristics fall within certain boundaries, for example, weight or dimensions. At 830, the package may be labeled, for example, with a destination address and/or with shipping warnings such as fragile or the like. At 840, the package passed through post labeling inspection 840. At this point an agent or an automated device may inspect the label to ensure the label is affixed correctly and can be read, for example. Subsequent to leaving the pre-shipment module, the package may enter a visual indicator applicator device 865 or an agent may interact with the package to affix a visually distinctive indicator. Either of the agent (e.g., agent 410 in FIG. 4) or the automated device 865 may receive instructions to apply the indicator from grouping control 300. In some embodiments, the visually distinctive indicator may be applied at the time of labeling, or, as part of the label itself. In some embodiments, the package may then be sent on to shipping. In other embodiments, other types of processing, such a processing at a distribution center or at a manufacturer may be performed either before or after application of the visually distinguishing indicator. For example, the processing may be performed on groups of the containers or groups of items from the containers as a group.

FIG. 9 illustrates a control system, according to some embodiments. As illustrated, the control system (e.g., a grouping control system) comprises various components such as a grouping control component 300. In various embodiments, the components and modules and data store illustrated in FIG. 9 may implement the processes disclosed herein and/or may enable the various devices disclosed to perform various of the disclosed processes. FIG. 9 illustrates that grouping control component 300 may be coupled to data store 902 and may send and receive message with data store 902. Alternatively, part or all of grouping control component 300 may be separate from the control system (e.g., control system 250) and perform functions separate from control system 250. In some embodiments, data store 902 may be an enterprise data store configured to store all or most of the data of an enterprise (e.g., materials handling facility). In other embodiments, data store 902 represents a distributed collection of various independent data stores each tailored and particularly suited to the data contained therein. As illustrated in FIG. 9, data store 902 may store grouping information for some of or for each container as well as numerous identifications for numerous respective visually distinctive indicators. The grouping information may indicate what group a container is part or whether a container is associated with a group at all. The numerous identifications for numerous respective visually distinctive indicators may provide a way for the system to communicate which visually distinctive indicator to instruct application. The data store may maintains records of the available visually distinctive indicators and how those indicators have been used historically and/or how those indicators may be used in the future, in some embodiments. Data store 902 may also include another data store, such as a product database for storing location information associated with each item handled within the facility.

In embodiments, the grouping control component 300 may be configured to send and receive grouping data from and to data store 902 as well as various devices of the materials handling facility (e.g., visual indicator applicator 750 of FIG. 7). The grouping control component 300 may be configured to access the stored grouping data for a given group or container when determining the grouping of a container. The grouping control component 300 may include various software modules that each provides various specialized functionality pertaining to locations of inventory, agents and illumination devices. While the software modules are illustrated as part of grouping control component 300, alternative embodiments are contemplated wherein any of the software modules exist outside of the grouping control component 300 or outside the control system (e.g., control system 250).

As illustrated, grouping control component 300 may interact with a visual indicator applicator (e.g., visual indicator applicator 750) as well as with various image capture devices (e.g., the image devices in FIG. 1 or the camera 495 in FIG. 4) and or various communication devices used to communicate (e.g., display or otherwise communicate missort alerts or re-sort instructions) with agents.

Grouping control component 300 is illustrated with indicator manager 310 and group analyzer 350. In some embodiments, indicator manager 310 may perform all or some of the processes illustrated in FIG. 5 and described above. For example, the grouping module 904 of indicator manager 310 may identify a container and determine a group that the identified container should be grouped with as illustrated at blocks 510 and 520 of FIG. 5. Visual indicator determiner 906 of indicator manager 310 may assign an indicator to the grouping if one has not been assigned yet as illustrated at blocks 540 and 550 of FIG. 5. Grouping control component 300 may send instructions to apply the assigned or determined indicator to the container and send instructions to send the input container to a grouping container, as illustrated at blocks 560, 570. For example, grouping control component 300 may send an instruction to a display of a device where an agent can read the instructions to apply the indicator or may send an instruction to a device that applies the indicator to the container. In some embodiments, the instructions for grouping a container may come from outside the sortation area, while in other embodiments, another level of refinement of the grouping may be applied inside the sortation area. For example the instructions to the sortation area might be "put this container on one of these five trucks" and the sortation area, at its option, could choose to visually distinguish each of the 5 trucks, or, give them the same visual identification. In various embodiments, the instructions for grouping a container may come from outside the grouping control component 300, for example, from other enterprise software or from another enterprise.

Group analyzer 350 may perform all of some of the processes illustrated in FIG. 6 and described above. For example, image obtainer 910 of group analyzer 350 may receive images of grouping containers and/or input containers. The images may be received from various image capture devices such as those disclosed herein, for example. Graphic comparator 912 may analyze the image to identify or determine a dominant indicator of the containers in the image, as illustrated at block 620, for example. Mis-sort determiner 914 may receive the results from graphic comparator 912 and determine whether any containers in a grouping container do not match the dominant visually distinguishable indicator as illustrated at block 630. If there are mis-matches the mis-sort determiner may issue message 916, as illustrated at block 640 of FIG. 6, for example. The mis-sort message 916 may be sent to a communication device of an agent, to direct the agent to re-sort the mis-sorted container for example.

In some embodiments, a mis-sort message may be a message (e.g., even if the mis-sort is caught too late to change, a message may be issued such that the mis-sort is recorded and/or a plan to address the re-sort may be made). The message may be an alert (e.g., an indication to perform some action) or an informational message, for example, to inform a recipient. In some embodiments, a mis-sort message may be sent to the facility that is receiving a shipping vehicle with a mis-sorted container.

Exemplary System

Figure 10:
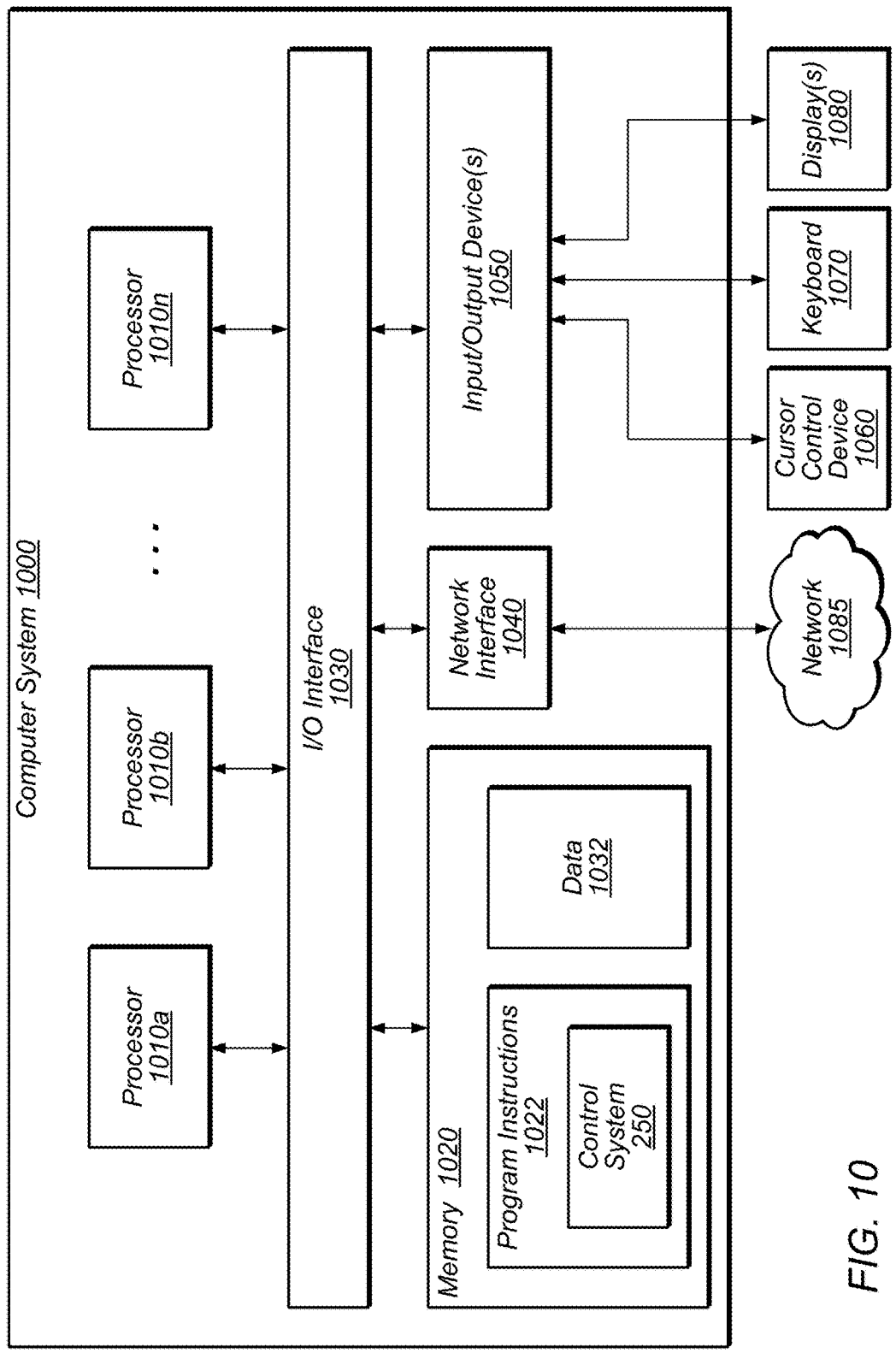
FIG. 10 is a block diagram illustrating an exemplary embodiment of a computer system for use in a system that implements application and analysis of visually distinctive indicators in embodiments.

In one embodiment, a system that implements one or more components of a system and method for application and analysis of visually distinctive indicators to facilitate detection of grouping errors as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a control system 250 and/or communication devices and visual indicator applicator 750 of a system and method for application and analysis of visually distinctive indicators to facilitate detection of grouping errors, are shown stored within system memory 1020 as program instructions 1022.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085, such as other computer systems, communications devices, control mechanisms, readers, scanners and so on that are components of the system and method for generating a visual display indicating the status of multiple shipping loads. The communications channels may include, but are not limited to conventional and mobile telephone and text messaging communications channels. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 10 for implementing a control system for, or possibly other components of a system and method for generating a visual display indicating the status of multiple shipping loads. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 1000 via I/O interface 1030. A computer-accessible medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that embodiments embrace all such modifications and changes and, accordingly, the above description to be regarded in an illustrative rather than a restrictive sense.

The invention claimed is:

1. A system, comprising:
one or more computing devices configured to implement a control system configured to:
for each of a plurality of input containers:
determine a grouping for the input container;
determine a visually distinctive indicator for the determined grouping, wherein the determined visually distinctive indicator is visually distinctive from one or more other visually distinctive indicators for one or more other groupings; and
subsequent to said determine the visually distinctive indicator, send an instruction to apply the determined visually distinctive indicator to the input container; and
a visual indicator applicator configured to receive the instruction to apply the determined visually distinctive indicator and, in response, to cause the determined visually distinctive indicator to be applied to the respective input container;
wherein the control system is further configured to:
direct the input container to a grouping container for the grouping; and
instruct a visual verification of the grouping container based at least in part on the visually distinctive indicator for the grouping for the input container, wherein one or more input containers without the determined visually distinctive indicator are readily visually distinguishable from input containers of the grouping having the determined visually distinctive indicator.

2. The system of claim 1, further comprising:
a docking bay indicator associated with a docking bay, wherein said each of the plurality of input containers is a shipment and the grouping container is a shipping container stationed at the docking bay; and
wherein to direct the input container to the grouping container, the control system is further configured to:
direct the docking bay indicator to display an indicator that matches the visually distinctive indicator determined for the grouping.

3. The system of claim 1, wherein to determine the visually distinctive indicator for the determined grouping, the control system is further configured to select a particular visually distinctive indicator as a color, shape or pattern or combination of color, shape or pattern.

4. A method, comprising:
performing, by one or more computing devices:
for each of a plurality of input containers:
determining a grouping for the input container;
determining a visually distinctive indicator for the determined grouping, wherein the determined visually distinctive indicator is visually distinctive from one or more other visually distinctive indicators for one or more other groupings;
subsequent to said determining the visually distinctive indicator, instructing the determined visually distinctive indicator to be applied to the input container; and
directing the input container to a grouping container for the grouping.

5. The method of claim 4,
wherein said each of the plurality of input containers is a shipment and the grouping container is a shipping vehicle stationed at a docking bay with a respective docking bay indicator; and
wherein directing the input container to a grouping container for the grouping comprises directing the docking bay indicator to display an indicator that matches the visually distinctive indicator determined for the grouping.

6. The method of claim 4, wherein the determined visually distinctive indicator is a color, shape or pattern or combination of color, shape or pattern.

7. The method of claim 4, further comprising:
receiving an image of the input containers in the grouping container;
determining, from analysis of the received image, whether any input containers in the grouping container do not exhibit the visually distinctive indicator; and
outputting a message for any containers in the grouping container that do not exhibit the visually distinctive indicator.

8. The method of claim 7, further comprising instructing, in response to determining that a container in the grouping container does not exhibit the visually distinctive indicator, a re-sort of the input container in the grouping container that does not exhibit the visually distinctive indicator.

9. The method of claim 4, further comprising grouping, subsequent to said directing the input container to the grouping container for the grouping, the grouping container with one or more other grouping containers that also group input containers exhibiting the same determined visually distinctive indicator such that one or more containers among the group of grouping containers that do not exhibit the determined visually distinctive indicator are readily distinguishable from the input containers of the group of grouping containers.

10. The method of claim 4, further comprising applying the determined visually distinctive indicator to the input container such that the applied visually distinctive indicator indicates a proper orientation for the input container.

11. The method of claim 4, further comprising:
determining another visually distinctive indicator for another determined grouping;
instructing the another determined visually distinctive indicator to be applied to another input container; and
directing the input container to another grouping container, wherein a different visually distinctive indicator is assigned to each different grouping.

12. A non-transitory computer-readable medium, storing program instructions computer-executable to perform:
for each of a plurality of input containers:
determining a grouping for the input container;
determining a visually distinctive indicator for the determined grouping, wherein the determined visually distinctive indicator is visually distinctive from one or more other visually distinctive indicators for one or more other groupings;
subsequent to said determining the visually distinctive indicator for the determined grouping, instructing the determined visually distinctive indicator to be applied to the input container; and instructing the input container to be directed to a grouping container for the grouping.

13. The non-transitory medium of claim 12, wherein each of the plurality of input containers is a shipment and the grouping container is a shipping vehicle stationed at a docking bay with a respective docking bay indicator; and wherein to instruct the input container to be directed to the grouping container for the grouping the program instructions are further executable to perform directing the docking bay indicator to display an indicator that matches the visually distinctive indicator determined for the grouping.

14. The non-transitory medium of claim 12, wherein to instruct the determined visually distinctive indicator to be applied to the input container grouping the program instructions are further executable to perform instructing the application of tape, wrap, paint, ink, light, electromagnetic radiation, current or voltage to the input container to create the visually distinctive indicator to alter the appearance of the input container.

15. The non-transitory medium of claim 12, wherein the program instructions are further executable to perform:

receiving an image of the input containers in the grouping container;

determining, from analysis of the received image, whether any input containers in the grouping container do not exhibit the visually distinctive indicator; and outputting a message for any input containers in the grouping container that do not exhibit the visually distinctive indicator.

16. The non-transitory medium of claim 15, wherein the program instructions are further executable to perform instructing, in response to determining that a container in the grouping container does not exhibit the visually distinctive indicator, a re-sort of the input container in the grouping container that does not exhibit the visually distinctive indicator.

17. The non-transitory medium of claim 12, wherein the grouping container is a virtual container and wherein to instruct the input container to be directed to a grouping container for the grouping the program instructions are further executable to perform directing the input container to the virtual container.

18. The non-transitory medium of claim 12, wherein the program instructions are further executable to instruct modifying, subsequent to said instructing the input container to be directed to a grouping container for the grouping, the visually distinctive indicator of the input container to create a modified visually distinctive indicator such that the input container with the modified visually distinctive indicator is associated with another grouping container.

19. The non-transitory medium of claim 12, wherein the program instructions are further executable to perform associating the determined visually distinctive indicator with a shipping channel such that input containers exhibiting the determined visually distinctive indicator are directed to the shipping channel.

20. The non-transitory medium of claim 12, wherein to instruct the input container to be directed to a grouping container for the grouping the program instructions are further executable to perform instructing shipment of the input container via the grouping container that comprises a shipping transport, wherein the input container is a shipment being shipped in response to an order for an item, the order placed on a network-based site.

* * * * *